US012631459B2

(12) United States Patent
Xia et al.

(10) Patent No.: US 12,631,459 B2
(45) Date of Patent: May 19, 2026

(54) TRAINING METHOD FOR MAP-GENERATION LARGE MODEL AND MAP GENERATION METHOD

(71) Applicant: Beijing Baidu Netcom Science Technology Co., Ltd., Beijing (CN)

(72) Inventors: Deguo Xia, Beijing (CN); Xiyan Liu, Beijing (CN); Jizhou Huang, Beijing (CN)

(73) Assignee: Beijing Baidu Netcom Science Technology Co., Ltd. (CN)

( * ) Notice: Subject to any disclaimer, the term of this patent is extended or adjusted under 35 U.S.C. 154(b) by 0 days.

(21) Appl. No.: 18/747,669

(22) Filed: Jun. 19, 2024

(65) Prior Publication Data

US 2024/0344832 A1      Oct. 17, 2024

(30) Foreign Application Priority Data

Oct. 20, 2023    (CN) .......................... 202311371914.4

(51) Int. Cl.
| | |
|---|---|
| *G01C 21/00* | (2006.01) |
| *G01C 21/32* | (2006.01) |
| *G06F 16/29* | (2019.01) |

(52) U.S. Cl.
CPC ......... *G01C 21/32* (2013.01); *G01C 21/3804* (2020.08); *G06F 16/29* (2019.01)

(58) Field of Classification Search
CPC ..... G01C 21/32; G01C 21/3804; G06F 16/29; Y02T 10/40; G06V 10/774; G06V 10/26; G06V 10/74; G06V 10/764; G06V 10/766
See application file for complete search history.

(56) References Cited

U.S. PATENT DOCUMENTS

| | | | |
|---|---|---|---|
| 11,428,537 B2 * | 8/2022 | Lavy ..................... | G06V 20/56 |
| 2021/0201050 A1 | 7/2021 | Marschner et al. | |

(Continued)

FOREIGN PATENT DOCUMENTS

| | | |
|---|---|---|
| CN | 144626437 A | 6/2022 |
| CN | 115331188 A | 11/2022 |
| CN | 116300928 A | 6/2023 |

OTHER PUBLICATIONS

First Office Action in Chinese Patent Application No. 202311371914.4 dated Apr. 1, 2026.

(Continued)

*Primary Examiner* — Ian Jen
(74) *Attorney, Agent, or Firm* — Dilworth IP, LLC

(57) ABSTRACT

A training method for a map-generation large model is provided, including: obtaining a training sample set, each training sample in the training sample set including a road top-view sample, a first vectorized point set and a first category of a first road element, and a first mask of the road top-view sample; inputting the road top-view sample into an initial map-generation large model, and correspondingly outputting a second vectorized point set and a second category of the second road element, and a second mask of the road top-view sample; determining a model loss according to a matching result between the second and first road element, the first vectorized point set, the first category, the first mask, the second vectorized point set, the second category and the second mask, and adjusting a parameter of the initial map-generation large model according to the model loss to obtain a map-generation large model.

19 Claims, 6 Drawing Sheets

Obtaining a training sample set, where each training sample in the training sample set includes a road top-view sample, a first vectorized point set and a first category of a first road element in the road top-view sample, and a first mask of the road top-view sample    S101

Inputting the road top-view sample into an initial map-generation large model, and correspondingly outputting a second vectorized point set of a second road element, a second category of the second road element, and a second mask of the road top-view sample by a regression module, a classification module and a segmentation module in the initial map-generation large model respectively    S102

Determining a model loss according to a matching result between the second road element and the first road element, the first vectorized point set, the first category, the first mask, the second vectorized point set, the second category and the second mask, and adjusting a parameter of the initial map-generation large model according to the model loss to obtain a map-generation large model    S103

(56)     References Cited

U.S. PATENT DOCUMENTS

2022/0147822 A1      5/2022   Xin et al.
2023/0400327 A1*   12/2023   Streem ...................... G06T 7/74
2024/0135561 A1*    4/2024   Ding ...................... G06V 10/26

OTHER PUBLICATIONS

Zhu, Xizhou et al., Deformable DETR: Deformable Transformers for End-to-End Object Detection, ICLR, Mar. 18, 2021, pp. 1-16.
Li, Qi et al., HDMapNet: An Online HD Map Construction and Evaluation Framework, Mar. 18, 2022, pp. 1-7.
Liao, Bencheng et al., MapTR: Structured Modeling and Learning For Online Vectorized HD Map Construction, ICLR, Jan. 30, 2023, pp. 1-18.

* cited by examiner

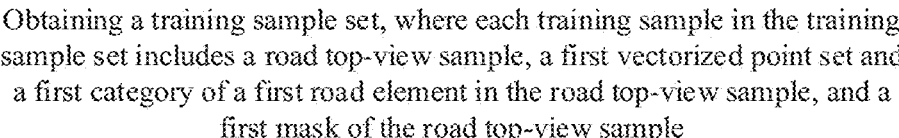

Obtaining a training sample set, where each training sample in the training sample set includes a road top-view sample, a first vectorized point set and a first category of a first road element in the road top-view sample, and a first mask of the road top-view sample    S101

Inputting the road top-view sample into an initial map-generation large model, and correspondingly outputting a second vectorized point set of a second road element, a second category of the second road element, and a second mask of the road top-view sample by a regression module, a classification module and a segmentation module in the initial map-generation large model respectively    S102

Determining a model loss according to a matching result between the second road element and the first road element, the first vectorized point set, the first category, the first mask, the second vectorized point set, the second category and the second mask, and adjusting a parameter of the initial map-generation large model according to the model loss to obtain a map-generation large model    S103

FIG. 1

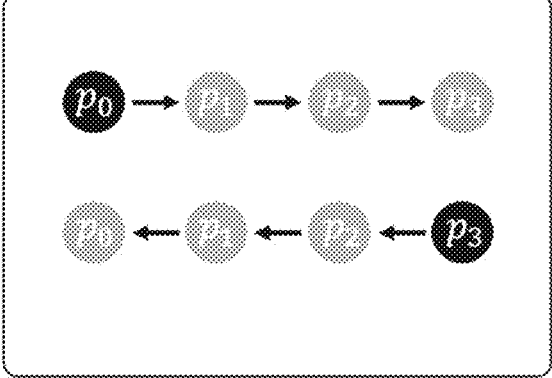

FIG. 2

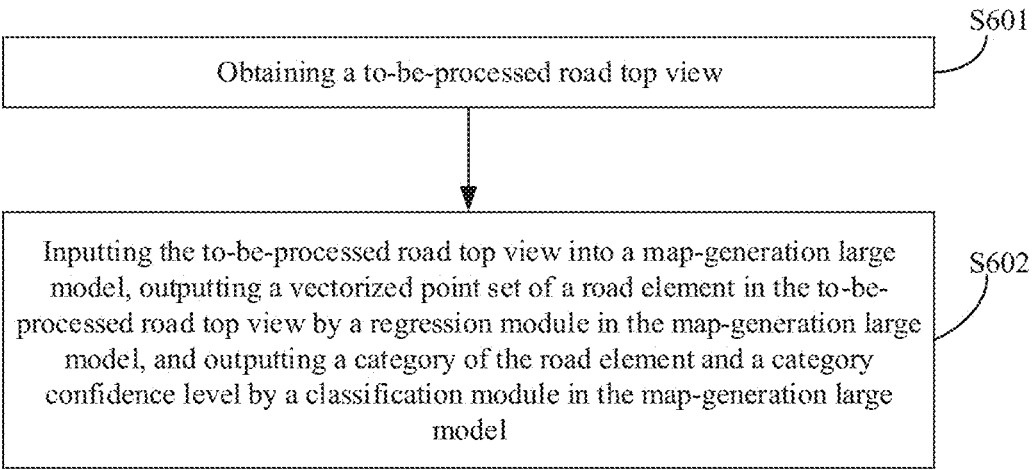

S601

Obtaining a to-be-processed road top view

S602

Inputting the to-be-processed road top view into a map-generation large model, outputting a vectorized point set of a road element in the to-be-processed road top view by a regression module in the map-generation large model, and outputting a category of the road element and a category confidence level by a classification module in the map-generation large model

FIG. 6

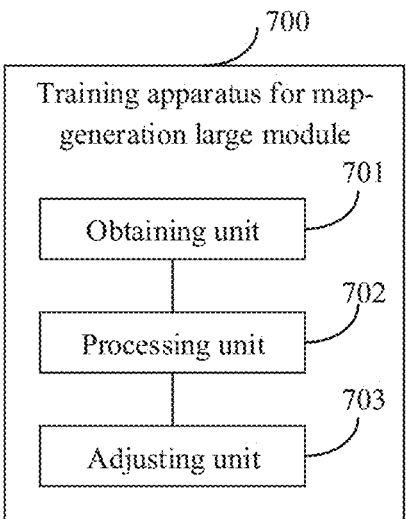

700

Training apparatus for map-generation large module

701

Obtaining unit

702

Processing unit

703

Adjusting unit

FIG. 7

TRAINING METHOD FOR MAP-GENERATION LARGE MODEL AND MAP GENERATION METHOD

CROSS-REFERENCE TO RELATED APPLICATION

This application claims priority to Chinese Patent Application No. 202311371914.4, filed on Oct. 20, 2023, which is hereby incorporated by reference in its entirety.

TECHNICAL FIELD

The present disclosure relates to the fields of autonomous driving, intelligent transportation, and image recognition in the field of artificial intelligence, and in particular, to a training method for a map-generation large model and a map generation method.

BACKGROUND

As an important foundation for intelligent driving and intelligent transportation, a map has become a necessary option and core foundation for autonomous driving at L3 and above levels and has an irreplaceable role by providing high-precision positioning, a lane-level path planning capability, and information such as rich road element data. The map can realize an automobile hyper-vision perception and effectively improve algorithmic efficiency and safety redundancy, and is one of basic technologies for autonomous driving.

SUMMARY

The present disclosure provides a training method for a map-generation large model and a map generation method.

According to a first aspect of the present disclosure, a training method for a map-generation large model is provided, including:

obtaining a training sample set, where each training sample in the training sample set includes a road top-view sample, a first vectorized point set and a first category of a first road element in the road top-view sample, and a first mask of the road top-view sample;

inputting the road top-view sample into an initial map-generation large model, and correspondingly outputting a second vectorized point set of a second road element, a second category of the second road element, and a second mask of the road top-view sample by a regression module, a classification module and a segmentation module in the initial map-generation large model respectively;

determining a model loss according to a matching result between the second road element and the first road element, the first vectorized point set, the first category, the first mask, the second vectorized point set, the second category and the second mask, and adjusting a parameter of the initial map-generation large model according to the model loss to obtain a map-generation large model.

According to a second aspect of the present disclosure, a map generation method is provided, including:

obtaining a to-be-processed road top view;

inputting the to-be-processed road top view into a map-generation large model, outputting a vectorized point set of a road element in the to-be-processed road top view by a regression module in the map-generation large model, and outputting a category of the road element and a category confidence level by a classification module in the map-generation large model;

where the map-generation large model is obtained after an iterative training for an initial map-generation large model by using a training sample set, and each training sample in the training sample set includes a road top-view sample, a first vectorized point set and a first category of a first road element in the road top-view sample, and a first mask of the road top-view sample; the regression module, the classification module and a segmentation module in the initial map-generation large model correspondingly output a second vectorized point set of a second road element, a second category of the second road element, and a second mask of the road top-view sample respectively; and a loss function of the iterative training is determined according to a matching result between the second road element and the first road element, the first vectorized point set, the first category, the first mask, the second vectorized point set, the second category and the second mask.

According to a third aspect of the present disclosure, a training apparatus for a map-generation large model is provided, including:

at least one processor; and a memory communicatively connected to the at least one processor; where, the memory stores instructions executable by the at least one processor, and the instructions are executed by the at least one processor to enable the at least one processor to:

obtain a training sample set, where each training sample in the training sample set includes a road top-view sample, a first vectorized point set and a first category of a first road element in the road top-view sample, and a first mask of the road top-view sample;

input the road top-view sample into an initial map-generation large model, and correspondingly output a second vectorized point set of a second road element, a second category of the second road element and a second mask of the road top-view sample by a regression module, a classification module and a segmentation module in the initial map-generation large model respectively;

determine a model loss according to a matching result between the second road element and the first road element, the first vectorized point set, the first category, the first mask, the second vectorized point set, the second category and the second mask, and adjust a parameter of the initial map-generation large model according to the model loss to obtain a map-generation large model.

According to a fourth aspect of the present disclosure, a map generation apparatus is provided, including:

at least one processor; and a memory communicatively connected to the at least one processor; where, the memory stores instructions executable by the at least one processor, and the instructions are executed by the at least one processor to enable the at least one processor to:

obtain a to-be-processed road top view;

input the to-be-processed road top view into a map-generation large model, output a vectorized point set of a road element in the to-be-processed road top view by a regression module in the map-generation large model, and output a category of the road element and a category confidence level by a classification module in the map-generation large model;

where the map-generation large model is obtained after an iterative training for an initial map-generation large model by using a training sample set, and each training sample in the training sample set includes a road top-view sample, a first vectorized point set and a first category of a first road element in the road top-view sample, and a first mask of the road top-view sample; the regression module, the classification module and a segmentation module in the initial map-generation large model correspondingly output a second vectorized point set of a second road element, a second category of the second road element, and a second mask of the road top-view sample respectively; and a loss function of the iterative training is determined according to a matching result between the second road element and the first road element, the first vectorized point set, the first category, the first mask, the second vectorized point set, the second category and the second mask.

According to a fifth aspect of the present disclosure, a non-transient computer-readable storage medium storing computer instructions is provided, where the computer instructions are used to cause a computer to perform the method described in the first aspect or the second aspect.

It should be understood that content described in this section is not intended to identify key or important features of embodiments of the present disclosure, nor is it intended to limit the scope of the present disclosure. Other features of the present disclosure will be readily understood by the following description.

BRIEF DESCRIPTION OF DRAWINGS

Accompanying drawings are used for a better understanding of the solutions and do not constitute a limitation of the present disclosure. Among them:

FIG. 1 is a schematic flowchart of a training method for a map-generation large model provided by an embodiment of the present disclosure.

FIG. 2 is a representation mode of a vectorized point set of a line element provided by an embodiment of the present disclosure.

FIG. 6 is a schematic flowchart of a map generation method provided by an embodiment of the present disclosure.

FIG. 7 is a schematic structural diagram of a training apparatus for a map-generation large model provided by an embodiment of the present disclosure.

DESCRIPTION OF EMBODIMENTS

Figure 3:
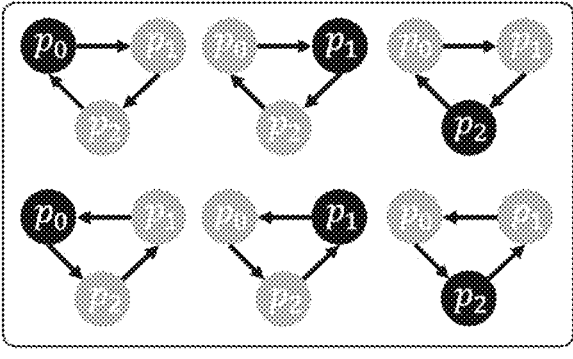
FIG. 3 is a representation mode of a vectorized point set of an surface element provided by an embodiment of the present disclosure.

Exemplary embodiments of the present disclosure are described hereinafter in conjunction with accompanying drawings, which include various details of the embodiments of the present disclosure in order to facilitate understanding, and they should be considered exemplary only. Accordingly, one of ordinary skill in the art should recognize that various changes and modifications can be made to the embodiments described herein without departing from scope and spirit of the present disclosure. Similarly, descriptions of well-known features and structures are omitted from the following description for the sake of clarity and brevity.

There are currently two main ways for generating maps. One way is a human-intensive mode, where the whole process includes that trained operators manually make road elements such as lane lines, road surfaces and the like, and then make a map by performing operations such as interrupting lane groups into groups according to rules. This way is less efficient, and quality of the map is greatly affected by the level of the operators, resulting in that the quality of the map has uncertainty. Another way is a mode based on general image recognition algorithms in combination with manual interactive interpretation, such as a multi-stage generation mode based on image segmentation combined with post-processing, which adopts a segmentation model to obtain pixel positions of road elements such as lines, surfaces and the like in an image, then extracts vectorized line and surface information through a post-processing strategy, such as fitting, line extraction, rarefying and the like, and then provides the same to operators to assist and interact to generate a map. This way has not yet realized a high degree of end-to-end automation of all elements, and is limited by an error accumulation in multi-stage processing, resulting in poor accuracy of results.

The present disclosure provides a training method for a map-generation large model and a map generation method, which are applied in the fields of autonomous driving, intelligent transportation and image recognition in the field of artificial intelligence, so as to realize an end-to-end map generation from a road top view to vectorized road elements, and to avoid the error accumulation due to the multi-stage processing.

Processing such as collection, storage, use, processing, transmission, provision and disclosure of personal information of users involved in technical solutions of the present disclosure is in compliance with relevant laws and regulations and does not violate public order and morals.

FIG. 1 is a flowchart of a training method for a map-generation large model provided by an embodiment of the present disclosure. As shown in FIG. 1, the method includes the following steps.

S101, obtaining a training sample set, where each training sample in the training sample set includes a road top-view sample, a first vectorized point set and a first category of a first road element in the road top-view sample, and a first mask (mask) of the road top-view sample.

The road top-view sample in the embodiment of the present disclosure may be a road top view obtained by directly photographing using a photographing apparatus or a road top view further generated according to other images and/or data, which is not limited in the embodiment of the present disclosure. For example, the road top-view sample may be a road top view generated according to a panoramic image and point cloud data obtained by a professional self-collection vehicle.

The first road element in the road top-view sample may be a line element such as a lane line, or a surface element such as a lane group, a crosswalk, a sign, and the like, where the lane group may be a class or a group of lane lines obtained by dividing the lane lines according to a customized rule. The number of the first road elements may be one or more. The road element in the embodiment of the present disclosure may be referred to as an instance (Instance).

The first vectorized point set and the first category of the first road element in the road top-view sample as well as the first mask of the road top-view sample are labeling information of the road top-view sample, and the labeling information may also be referred to as a ground truth (Ground Truth, GT). The first vectorized point set of the first road element is a vectorized point set ground truth, and the first category of the first road element is a category ground truth. The first mask of the road top-view sample may be determined according to the first vectorized point set, and the first mask is likewise a mask ground truth. Among them, the first category may be used to indicate a style, a color and the like of the first road element, and the category may also be referred to as an attribute.

S102: inputting the road top-view sample into an initial map-generation large model, and correspondingly outputting a second vectorized point set of a second road element, a second category of the second road element, and a second mask of the road top-view sample by a regression module, a classification module and a segmentation module in the initial map-generation large model respectively.

The initial map-generation large model in the embodiment of the present disclosure may be constructed according to a neural network, and the present disclosure does not limit a specific architecture of the model. The model adopts a multi-task learning framework, and realizes a plurality of prediction tasks through a plurality of modules, where the regression module is used to output the second vectorized point set of the second road element of the road top-view sample, the classification module is used to output the second category of the second road element, and the segmentation module is used to output the second mask of the road top-view sample. Outputs of the model may be referred to as model predicted values, i.e., the second vectorized point set is a vectorized point set predicted value, the second category is a category predicted value, and the second mask is a mask predicted value.

S103, determining a model loss according to a matching result between the second road element and the first road element, the first vectorized point set, the first category, the first mask, the second vectorized point set, the second category and the second mask, and adjusting a parameter of the initial map-generation large model according to the model loss to obtain a map-generation large model.

In order to determine differences between the model predicted values and the ground truths of the training sample for calculating the model loss, the second road element and the first road element need to be matched, for example, to match a plurality of lane lines in the training sample with a plurality of lane lines in a model output.

After determining the matching result between the second road element and the first road element, the differences between the corresponding model predicted values and the ground truths of the training sample may be determined according to a matching relationship between the second road element and the first road element. For example, a geometric loss may be determined according to the first vectorized point set of the first road element and the second vectorized point set of the second road element, and the geometric loss can reflect the difference in geometric positions between a point outputted by the model and a point in the training sample; a category loss may be determined according to the first category and the second category, and the category loss can reflect the difference between the category of the road element predicted by the model and the category ground truth of the road element in the training sample; a segmentation loss may be determined according to the first mask and the second mask, and the segmentation loss can be used to realize constraints on a feature hierarchy, so as to improve model accuracy.

The steps of S102 to S104 are repeated using the training samples in the training sample set for an iterative training, and the parameter of the initial map-generation large model is adjusted until a predetermined iteration stop condition is reached, to obtain the map-generation large model. The usage of the road top-view samples allows the model to fully learn a visual representation of a complex geographic scene and to have a high generalization ability. The multi-task learning framework can improve a learning ability of the model for the visual representations of the road elements, and the map-generation large model after training is completed can output vectorized point sets and categories of road elements according to inputted road top views that to be processed, thereby realizing end-to-end map generation, avoiding an error accumulation caused by multi-stage processing, and improving the map quality.

On the basis of the above embodiment, the training samples as well as a training process are described.

For model training, it is crucial to obtain high-quality training samples with labeling information, and the training samples in the embodiment of the present disclosure can be obtained according to the road top view and existing manually-labeled map data, which includes: obtaining the road top view and the manually-labeled map data; extracting raw data of road elements corresponding to the road top view from the manually-labeled map data, where the raw data of the road elements includes vectorized point sets and categories of the road elements; and processing the road top view and the corresponding raw data of the road elements to obtain the training sample set.

A large number of maps in the related technology are produced according to the manually-labeled map data. These existing manually-labeled map data can be utilized in the embodiment of the present disclosure to obtain the training samples, and the raw data of the road elements corresponding to the road top view is extracted from the manually-labeled map data according to the labeling information such as geometries, categories and the like.

In order to ensure that the training samples satisfy usage requirements and improve the quality of the training samples, the above road top view and the raw data of the road elements corresponding to the road top view need to be further processed. For example, if there is a black hole problem in the manually-labeled map data as original data, and the raw data of the road elements of the road top view that is extracted and obtained has a high proportion of missing, the road top view with an excessively high proportion of black block can be excluded by filtering through calculating a proportion of black block. As another example, for a problem that the raw data of the road elements corresponding to the road top view crosses mapsheets, complete raw data of the road elements can be obtained by loading a plurality of mapsheets. Ultimately, it is guaranteed that each road top-view sample in the training sample set has a corresponding set of first vectorized point sets $$P_{ori} = \{P_i\}_{i=0}^{N_{ori}-1}$$

and a corresponding set of first categories $$L_{ori} = \{L_i\}_{i=0}^{N_{ori}-1},$$

where $N_{ori}$ denotes the number of the actual first road elements in a single road top-view sample, $P_i$ denotes the first vectorized point set of a single first road element, and $L_i$ denotes the first category of a single first road element.

Considering modeling consistency, in the embodiment of the present disclosure, fitting and interpolation may also be performed on the first vectorized point set $P_i \in P_{ori}$ of each first road element in the road top-view sample, so as to obtain a homogeneous first vectorized point set $P_i=[p_0, p_1 \ldots, p_{N_p-1}]$ with $N_p$ points. If the number of pixel points of the first road element is less than $N_p$, then points with the actual number of pixel points are taken and complemented to $N_p$ points. For example, 0 to $N_p$ points may be complemented. In the embodiment of the present disclosure, the number of first road elements of the single road top-view sample may also be set to be $N_{ins}$, with $N_{ins}$ being set to a value greater than the number of road elements in a conventional road top view. For the road top-view sample where the actual number of first road elements is less than $N_{ins}$, the first vectorized point sets and the first categories are complemented by padding, with a padding portion denoted as $\emptyset$. Finally, the set of the first vectorized point sets of the single road top-view sample $$P_{frame} = \{P_i\}_{i=0}^{N_{ins}-1}$$

and the set of the corresponding first categories $$L_{frame} = \{L_i\}_{i=0}^{N_{ins}-1}$$

are obtained, and the ground truth of each first road element is denoted as $Y_i=(P_i, L_i)$. In addition, based on the first vectorized point sets of the first road elements, the first mask of the road top-view sample can also be determined, and the first mask includes a first semantic segmentation mask and a first instance segmentation mask.

The existing manually-labeled map data is converted into the labeling information of the road top-view samples required for the model training of the embodiments of the present disclosure, so there is no need to label large-scale road top-view samples and an automated construction for the training samples is realized.

Representations of the first vectorized point set of the first road element and the second vectorized point set of the second road element in an embodiment of the present disclosure may be adopting a polyline for a line element and adopting a polygon for an surface element. As shown in FIG. 2, a lane line is represented using the polyline. Considering that there is no need to distinguish directions for the polyline, there is no need to emphasize consistency for a starting point and an ending point. The arrangements from $p_0$ to $p_3$ and from p3 to p0 in FIG. 2 both represent the same lane line. As shown in FIG. 3, a lane group is represented using the polygon. For one lane group, an arrangement order of points does not affect the meaning of the representation. The arrangements with six different orders for $p_0$, $p_1$, and $p_2$ in FIG. 3 all represent the same lane group. The polygon composed of k points can be represented by 2×k equivalent arrangements.

Figure 4:
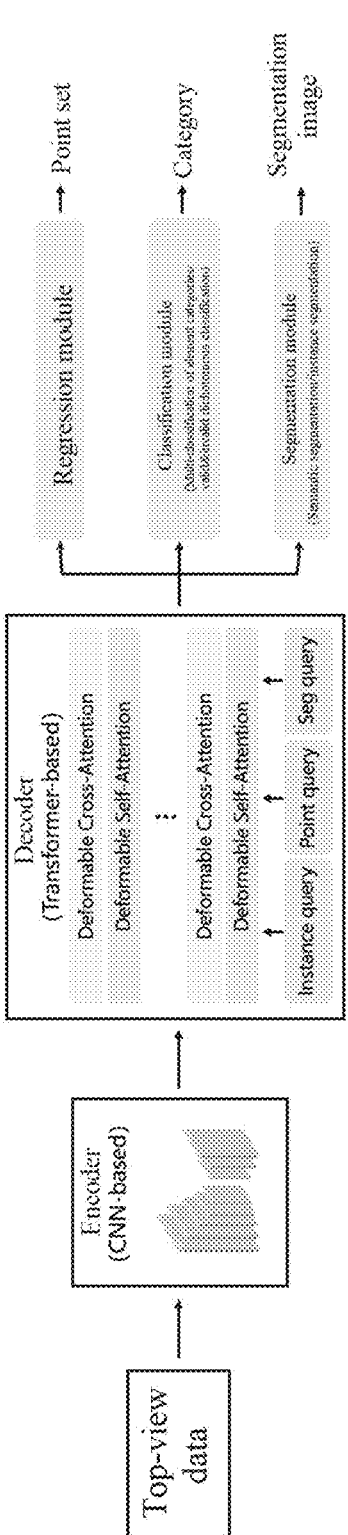
FIG. 4 is a schematic diagram of a model framework provided by an embodiment of the present disclosure.

The initial map-generation large model in an embodiment of the present disclosure may use a multi-task learning framework as shown in FIG. 4, which is only an illustration and is not intended to limit a model structure. Exemplarily, the initial map-generation large model includes an encoder based on convolutional neural networks (CNNs), a decoder based on a transformer, a regression module, a classification module, and a segmentation module. The encoder is used to map an inputted road top-view sample into a feature space to obtain a first visual representation. A plurality of deformable self-attention layers and deformable cross-attention layers may be included in the decoder, and the decoder obtains a second visual representation according to the first visual representation by learning contextual information of respective queries, where an instance query is a learnable parameter about instances, a point query is a learnable parameter about points, and a segmentation query (Seg query) is a learnable parameter about segmentation. The regression module outputs the second vectorized point set of the second road element according to the second visual representation, the classification module outputs the second category of the second road element according to the second visual representation, and the segmentation module outputs a segmentation map, i.e., the second mask, according to the second visual representation, which includes a second semantic segmentation mask and a second instance segmentation mask. A model output is denoted as frame $$\hat{Y}_{frame} = \{\hat{Y}_i\}_{i=0}^{N_{ins}-1},$$

where $\hat{Y}_i=(\hat{P}_i, \hat{L}_i, \hat{S}_i)$ represents one second road element, where $\hat{P}_i$ denotes the second vectorized point set of the second road element, $\hat{P}_i=[\hat{p}_0, \hat{p}_1 \ldots, \hat{p}_{N_p-1}]$, $\hat{L}_i$ denotes the second category of the second road element, and Si denotes the second instance segmentation mask corresponding to the single second road element. The second mask may include the second semantic segmentation mask and the second instance segmentation mask. In addition to $\hat{S}_i$, the segmentation module further outputs one second semantic segmentation mask for the entire road top-view sample.

In a training stage, the road top-view sample from the training sample is inputted to the initial map-generation large model to obtain a prediction result outputted by the model, after which the second road element outputted by the model needs to be matched with the first road element of the training sample to calculate the model loss. In order to improve matching accuracy, in the embodiment of the present disclosure, two aspects, namely, the vectorized point set and the category, are combined to match the second road element and the first road element.

A matching result includes an element-level matching result and a point-level matching result. The element-level matching result reflects a matching relationship between the second road element and the first road element, and the point-level matching result reflects a matching relationship between points of the second road element and the first road element that are matched. Exemplarily, the element-level matching result between the second road element and the first road element is determined according to the second vectorized point set and the second category of the second road element as well as the first vectorized point set and the first category of the first road element; the first road element and the second road element that are matched are determined according to the element-level matching result; and for the first road element and the second road element that are matched, the point-level matching result between the points of the first road element and the second road element that are matched is determined according to the first vectorized point set of the first road element and the second vectorized point set of the second road element. The element-level matching result can be used to determine an element-level model loss, and the point-level matching result can be used to determine a point-level model loss. A representation capability of the model can be improved by combining losses in different dimensions.

In an implementation, the second road elements and the first road elements are mapped one-to-one. A geometric loss between the second road element and the first road element that correspond to each other is determined according to the second vectorized point set of the second road element and the first vectorized point set of the first road element, and a category loss between the second road element and the first road element that correspond to each other is determined according to the second category of the second road element and the first category of the first road element. A sum of the geometric loss and the category loss is taken as a matching loss between the second road element and the first road element that correspond to each other. Then a sum of the matching losses between the second road elements and the first road elements that correspond to each other respectively is determined. All possible one-to-one correspondences between the second road elements and the first road elements are traversed, and the one-to-one correspondence between the second road elements and the first road elements with the minimum sum is taken as the element-level matching result between the second road elements and the first road elements. The matching accuracy is improved by jointly performing the matching of the road elements from both geometric and category dimensions.

The first road elements with the number of $N_{ins}$ are arranged in a certain order as a sequence, and $\mathcal{J}$ is used in the embodiment of the present disclosure to denote a possible sorted sequence of the second road elements, where the number of the second road elements is likewise $N_{ins}$. Then an optimal sequence K of the matching between the second road elements and the first road elements can be expressed as:

$$K = \underset{K \in \mathcal{J}}{\arg\min} \sum_{i=0}^{N_{ins}-1} \mathrm{cost}_{ins}\left(\hat{Y}_{\mathcal{J}(i)}, Y_i\right)$$

where $\mathrm{cost}_{ins}$ denotes the matching loss between the first road element and the second road element, and $\hat{Y}_{\mathcal{J}(i)}$ denotes the $i^{th}$ second road element in the sequence $\mathcal{J}$. $\mathrm{cost}_{ins}$ consists of the category loss and the geometric loss:

$$\mathrm{cost}_{ins}\left(\hat{Y}_{\mathcal{J}(i)}, Y_i\right) = \mathrm{cost}_{cls}\left(\hat{L}_{\mathcal{J}(i)}, L_i\right) + \mathrm{cost}_{geo}\left(\hat{P}_{\mathcal{J}(i)}, P_i\right)$$

where $\mathrm{cost}_{cls}$ denotes the category loss, and exemplarily, the category loss adopts a focal loss; and $\mathrm{cost}_{geo}$ denotes the geometric loss, which is used to measure a geometric correlation between the second vectorized point set and the first vectorized point set, and exemplarily, the geometric loss adopts the Hungarian matching algorithm.

Respective second road elements in the sequence K of the second road elements obtained above correspond one-to-one to the first road elements in an arrangement order, and this one-to-one correspondence is the element-level matching result between the second road elements and the first road elements. Since it is possible that some of the first road elements in the $N_{ins}$ first road elements are actual first road elements and other first road elements are padded first road elements, in the element-level matching result of the embodiment of the present disclosure, if a second road element corresponds to an actual first road element, it can be determined that this second road element is matched with the corresponding first road element; and if a second road element corresponds to a padded first road element, it can be determined that there is no first road element matched with this second road element.

Exemplary, taking $N_{ins}$ being 3 as a simple example, 3 first road elements in the road top-view sample are denoted as a, b and c in turn, and 3 second road elements outputted by the model are denoted as A, B and C. Matching the second road elements with the first road elements, respective second road elements in the obtained sequence K are arranged in accordance with A, B and C, which means that the matching result between the second road elements and the first road elements is that A corresponds to a, B corresponds to b, and C corresponds to c. Assuming that all 3 first road elements in the road top-view sample are the actual first road elements, it can be determined that the second road element A is matched with the first road element a, the second road element B is matched with the first road element b, and the second road element C is matched with the first road element c. Assuming that among the 3 first road elements in the road top-view sample, the first road elements a and b are the actual first road elements, and the first road element c is the padded first road element, it can be determined that the second road element A is matched with the first road element a, the second road element B is matched with the first road element b, and the second road element C has no matched first road element.

In an implementation, for the first road element and the second road element that are matched, points in the first vectorized point set of the first road element and points in the second vectorized point set of the second road element are mapped one-to-one. A geometric loss between a point in the first vectorized point set and a point in the second vectorized point set that correspond to each other is determined, and a sum of the geometric losses between the points in the first vectorized point set and the points in the second vectorized point set that correspond to each other respectively is determined. All possible one-to-one correspondences between the points in the first vectorized point set and the points in the second vectorized point set are traversed, and the one-to-one correspondence between the points in the first vectorized point set and the points in the second vectorized point set with the minimum sum is determined as the point-level matching result between the first road element and the second road element that are matched. On the basis that the point-level matching result is determined, in subsequent training process, in addition to determining losses between the road elements, the losses of the points can also be determined to improve the representation capability of the model.

$N_p$ points in the first vectorized point set are arranged in a certain order, and M is used in the embodiment of the present disclosure to denote a possible sorted sequence of the $N_p$ points in the second vectorized point set. An optimal sequence Q of the matching between the points in the second vectorized point set and the points in the first vectorized point set can be expressed as:

11

$$Q = \underset{Q \in M}{\arg\min} \sum\nolimits_{j=0}^{N_p-1} \mathrm{cost}_{point}\big(\hat{p}_{M(j)}, \, p_j\big)$$

where $\mathrm{cost}_{point}$ denotes the geometric loss between points, e.g., using the Manhattan distance, and $\hat{p}_{M(j)}$ denotes the $j^{th}$ second road element in the sequence M.

The respective points in the sequence Q of the second vectorized point set obtained above correspond one-to-one to the points in the first vectorized point set in the arrangement order, and this one-to-one correspondence is the point-level matching result between the first road element and the second road element that are matched. Since some points in the $N_p$ points in the first vectorized point set may be actual points of the first road element, and other points are padded points, in the point-level matching result of the embodiment of the present disclosure, if a certain point in the second vectorized point set corresponds to an actual point in the first vectorized point set, it can be determined that this point is matched with the corresponding point in the first vectorized point set; and if a certain point in the second vectorized point set corresponds to a padded point, then it can be determined that there is no point in the first vectorized point set matched with this point.

Exemplarily, taking $N_p$ being 4 as a simple example, for the first road element and the second road element that are matched, 4 points in the first vectorized point set of the first road element are $p_0$, $p_1$, $p_2$, and $p_3$ in turn, and 4 points in the second vectorized point set of the second road element are $\hat{p}_0$, $\hat{p}_1$, $\hat{p}_2$, and $\hat{p}_3$. Matching the second road element with the first road element, the points in the obtained sequence Q are arranged in the order of $\hat{p}_0$, $\hat{p}_1$, $\hat{p}_2$, and $\hat{p}_3$, that is, the point-level matching result between the second road element and the first road element is that $p_0$ corresponds to $\hat{p}p_0$, $p_1$ corresponds to $\hat{p}_1$, $p_2$ corresponds to $\hat{p}_2$, and $p_3$ corresponds to $\hat{p}_3$. Assuming that all 4 points in the first vectorized point set are the actual points, it can be determined that $p_0$ is matched with $\hat{p}_0$, $p_1$ is matched with $\hat{p}_1$, $p_2$ is matched with $\hat{p}_2$, and $p_3$ is matched with $\hat{p}_3$. Assuming that among the 4 points in the first vectorized point set, $p_0$, $p_1$ and $p_2$ are the actual points, and $p_3$ is the padded point, it can be determined that $p_0$ is matched with $\hat{p}_0$, $p_1$ is matched with $\hat{p}_1$, $p_2$ is matched with $\hat{p}_2$, and $p_3$ has no matched point.

In the case where the matching result is obtained, a description of how to determine the model loss is provided.

The model loss of an embodiment of the present disclosure is constructed according to a plurality of aspects, including: determining a point-level geometric loss between matched points in the first road element and the second road element that are matched as well as an element-level geometric loss between the first road element and the second road element that are matched according to the element-level matching result, the point-level matching result, the first vectorized point set and the second vectorized point set; determining the category loss between the first road element and the second road element that are matched as well as a match validity dichotomy loss between the second road element outputted by the model and the first road element in the road top view according to the element-level matching result, the first category and the second category; determining the segmentation loss according to the element-level matching result, the first mask and the second mask; performing a weighted summation of the point-level geometric loss, the element-level geometric loss, the category loss, the match validity dichotomy loss and the segmentation loss to obtain the model loss.

12

The losses are described below.

In an implementation, a distance between the matched points in the first road element and the second road element that are matched is determined according to the element-level matching result, the point-level matching result, the first vectorized point set and the second vectorized point set; and a sum of the distances between respective matched points in the first road elements and the second road elements that are matched respectively is determined as the point-level geometric loss. Exemplarily, the point-level geometric loss $\mathcal{L}_p$ adopts the following function:

$$\mathcal{L}_p = \sum\nolimits_{i=0}^{N_{ins}-1} \sum\nolimits_{j=0}^{N_p-1} dist\big(\hat{p}_{K(i),Q(j)}, \, p_{i,j}\big), \, L_i \neq \emptyset$$

where dist denotes a distance function between points, and exemplarily, the Manhattan distance is adopted; $p_{i,j}$ denotes the $j^{th}$ point in the first vectorized point set of the $i^{th}$ first road element, and $\hat{p}_{K(i),Q(j)}$ denotes the $j^{th}$ point in the sequence Q of the second vectorized point set of the $i^{th}$ second road element in the sequence K of the second road elements. $L_i \neq \emptyset$ denotes that only the distances between matched points are calculated in the above summation.

In an implementation, a cosine similarity between lines connecting adjacent points in the first road element and the second road element that are matched is determined according to the element-level matching result, the point-level matching result, the first vectorized point set and the second vectorized point set; and a sum of the cosine similarities between the lines connecting respective adjacent points in the first road elements and the second road elements that are matched respectively is determined as the element-level geometric loss. Exemplarily, the element-level geometric loss $\mathcal{L}$ Gins adopts the following function:

$$\mathcal{L}_{ins} = -\sum\nolimits_{i=0}^{N_{ins}-1} \sum\nolimits_{j=0}^{N_p-1} \mathrm{cosine}(\widehat{link}_{K(i),Q(j)}, \, link_{i,j}), \, L_i \neq \emptyset$$

where cosine denotes the cosine similarity, $link_{i,j}$ denotes the line between the $j^{th}$ point in the first vectorized point set of the $i^{th}$ first road element and its next point, and $\widehat{link}_{K(i),Q(j)}$ denotes the line between the $j^{th}$ point in the sequence Q of the second vectorized point set of the $i^{th}$ second road element in the sequence K of the second road elements and its next point. $L_i \neq \emptyset$ denotes that only the cosine similarities of the lines of the corresponding points in the first road elements and the second road elements that are matched are calculated in the above summation.

The accuracy of the vectorized point set predicted by the model is improved by using the geometric losses in both element-level and point-level dimensions.

In addition to the geometric loss, the accuracy in predicting categories of the road elements by the model is improved by the category loss. Exemplarily, the category loss $\mathcal{L}_{cls}$ uses the following function:

$$\mathcal{L}_{cls} = \sum\nolimits_{i=0}^{N_{ins}-1} \mathcal{L}_{focal}\big(\hat{L}_{K(i)}, \, L_i\big), \, L_i \neq \emptyset$$

where $\mathcal{L}_{focal}$ denotes a focal loss, $L_i$ denotes the first category of the $i^{th}$ first road element, $\hat{L}_{K(i)}$ denotes the second category of the $i^{th}$ second road element in the sequence K of the second road elements, and $L_i \neq \emptyset$ denotes that only the category losses of the first road elements and the second road elements that are matched are calculated in the above summation.

In an implementation, a probability of a category prediction may be used as a confidence score in an embodiment of the present disclosure, and for the second road element corresponding to a confidence level above a threshold, it will be used as a high-confidence prediction result. In the category loss function described above, a geometric position relationship between the first road element and the second road element can be introduced into category constraints, so that the confidence level can represent both the geometry and the category.

The road conditions in natural scenes are very complex, such as the presence of ground wear, occlusion, sudden changes in lighting, and the like, which poses a serious challenge to visual feature learning, resulting in that the model erroneously outputs different categories of redundant second road element vector results. In order to avoid this situation from a perspective of the model, an embodiment of the present disclosure may further introduce a valid/invalid dichotomous classification constraint, so as to classify a prediction result that is not matched to an actual first road element in to a class of being invalid. A loss function is as follows:

$$\mathcal{L}_{fb} = \sum_{i=0}^{N_{ins}-1} \mathcal{L}_{BCE}(\hat{L}_{K(i)}, L_{bce(i)})$$

$$L_{bce(i)} = \begin{cases} 0, & L_i \in \emptyset \\ 1, & L_i \notin \emptyset \end{cases}$$

where $\mathcal{L}_{BCE}$ denotes a binary cross-entropy loss function, $L_i$ denotes the first category of the $i^{th}$ first road element, $\hat{L}_{K(i)}$ denotes the second category of the $i^{th}$ second road element in the sequence K of the second road elements, $L_{bce(i)}$ takes the value of 0 or 1; $L_i \in \emptyset$ denotes that $L_i$ corresponding to $\hat{L}_{K(i)}$ is padded, that is to say, there is no matched first road element for the second road element, in which case $L_{bce(i)}$ is 0; and $L_i \notin \emptyset$ denotes that $L_i$ corresponding to $\hat{L}_{K(i)}$ is not padded, i.e., the second road element has a matched actual first road element, in which case $L_{bce(i)}$ is 1.

In the embodiment of the present disclosure, a semantic segmentation task as well as an instance segmentation task are introduced, so as to achieve constraints on a feature hierarchy by predicting the segmentation loss of the road element. The segmentation loss may include a phonetic segmentation loss and the instance segmentation loss. The first mask includes the first semantic segmentation mask and the first instance segmentation mask, and the second mask includes the second semantic segmentation mask and the second instance segmentation mask. The semantic segmentation loss between the first semantic segmentation mask and the second semantic segmentation mask is determined; the instance segmentation loss between the first instance segmentation mask and the second instance segmentation mask corresponding to the first road element and the second road element that are matched is determined according to the element-level matching result; and a sum of a sum of the instance segmentation losses of the first road elements and that second road elements that are matched respectively plus the semantic segmentation loss is determined as the segmentation loss. The instance segmentation loss and the semantic segmentation loss are utilized to enhance the representation capability of the model on the feature level.

Exemplarily, the segmentation loss $\mathcal{L}_{seg}$ may adopt a function as follows:

$$\mathcal{L}_{seg} = \mathcal{L}_{sem_{seg}} + \mathcal{L}_{ins_{seg}}$$

$$\mathcal{L}_{sem\_seg} = \mathcal{L}_{BCE}(\hat{M}_{sem}, M_{sem}) + \mathcal{L}_{dice}(\hat{M}_{sem}, M_{sem})$$

$$\mathcal{L}_{ins\_seg} = \sum_{i=0}^{N_{ins}-1} (\mathcal{L}_{BCE}(\hat{M}_{ins(K(i))}, M_{ins(i)}) + \mathcal{L}_{dice}(\hat{M}_{ins(K(i))}, M_{ins(i)}))$$

where $\mathcal{L}_{semantic\_seg}$ denotes the semantic segmentation loss, $\mathcal{L}_{instance\_seg}$ denotes the instance segmentation loss, $\hat{M}_{sem}$ denotes the second semantic segmentation mask, $M_{sem}$ denotes the first semantic segmentation mask, $\hat{M}_{ins(K(i))}$ denotes the second instance segmentation mask corresponding to the $i^{th}$ second road element in the sequence K of the second road elements, $M_{ins(i)}$ denotes the first instance segmentation mask corresponding to the $i^{th}$ road element, $\mathcal{L}_{BCE}$ denotes a binary cross-entropy loss, and $\mathcal{L}_{dice}$ denotes a Dice loss.

On the basis of the above losses, a model loss $\mathcal{L}_{all}$ that is determined finally is:

$$\mathcal{L}_{all} = \lambda_p \mathcal{L}_p + \lambda_{ins} \mathcal{L}_{ins} + \lambda_{cls} \mathcal{L}_{cls} + \lambda_{fb} \mathcal{L}_{fb} + \lambda_{seg} \mathcal{L}_{seg}$$

where $\lambda_p$, $\lambda_{ins}$, $\lambda_{cls}$, $\lambda_{seg}$, $\lambda_{fb}$, are weight coefficients of the losses respectively.

By constructing multifaceted losses, the model prediction is enabled to be more accurate, and vector results with stronger consistency are obtained, which avoids the model erroneously outputting different categories of the redundant road element vector results, and improves the visual representation capability of the model.

The model parameter is adjusted based on the above model loss, and a large scale of training samples are used for the iterative training, so that the model can fully learn the visual representation of the complex geographic scene and have a high generalization ability, thereby realizing the end-to-end map generation from the road top view to the vectorized road elements.

Figure 5:
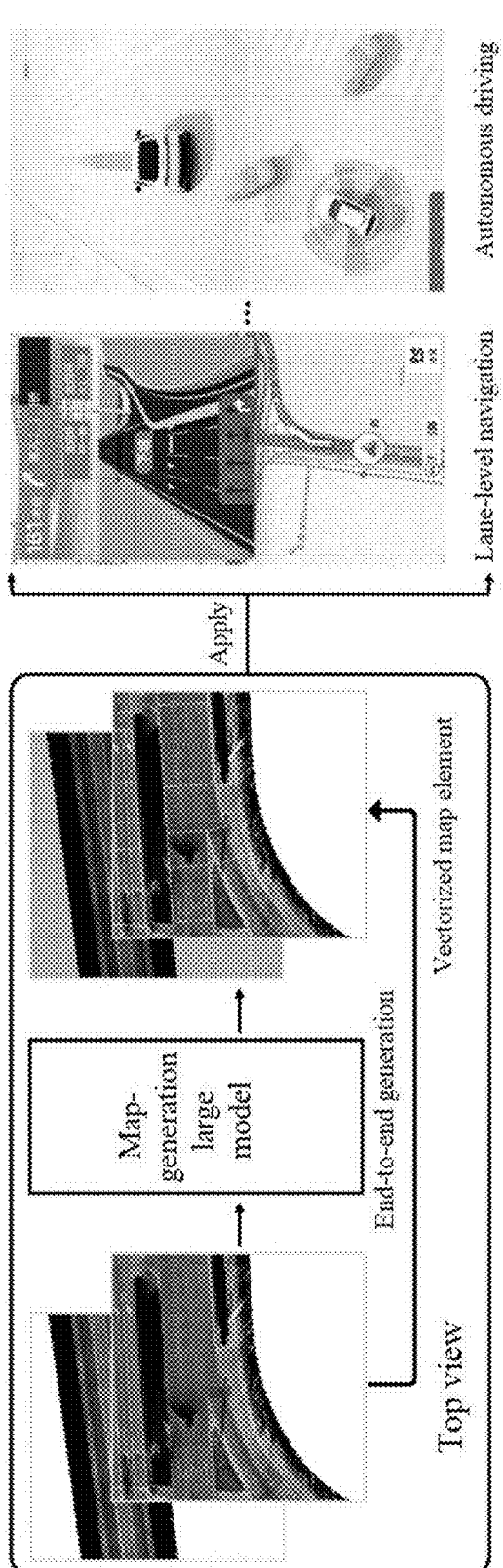
FIG. 5 is a schematic diagram of a model application scenario provided by an embodiment of the present disclosure.

After the map-generation large model is obtained when the training is completed, an embodiment of the present disclosure also provides an application method for the map-generation big mode. As shown in FIG. 5, a to-be-processed road top view can be inputted into the map-generation large model to obtain vectorized road elements, which can also be referred to as vectorized map features. On this basis, a vectorized map can be utilized for specific scenario applications such as lane-level navigation or autonomous driving.

FIG. 6 is a schematic flowchart of a map generation method provided by an embodiment of the present disclosure. As shown in FIG. 6, the method includes the following steps.

S601, obtaining a to-be-processed road top view.

The to-be-processed road top view in this embodiment is a road image for which a map is to be generated, and the to-be-processed road top view may be a road top view directly captured using a photographing apparatus or a road top view further generated according to other images and/or data, which is not limited in the embodiment of the present disclosure. For example, the to-be-processed road top view may be a road top view generated according to a panoramic image and point cloud data obtained by a professional self-collection vehicle.

S602: inputting the to-be-processed road top view into a map-generation large model, outputting a vectorized point set of a road element in the to-be-processed road top view by a regression module in the map-generation large model, and outputting a category of the road element and a category confidence level by a classification module in the map-generation large model.

The map-generation large model is obtained after performing an iterative training on an initial map-generation large model by using a training sample set, and each training sample in the training sample set includes a road top-view sample, a first vectorized point set and a first category of a first road element in the road top-view sample, and a first mask of the road top-view sample. The regression module, the classification module and a segmentation module in the initial map-generation large model correspondingly output a second vectorized point set of a second road element, a second category of the second road element, and a second mask of the road top-view sample respectively. A loss function of the iterative training is determined according to a matching result between the second road element and the first road element, the first vectorized point set, the first category, the first mask, the second vectorized point set, the second category and the second mask.

A training process of the map-generation large model may be completed in advance using the method of the preceding embodiments. At a stage of applying the map-generation large model to generate a map after the training of the model is completed, the map-generation large model may be utilized to output only the vectorized point set and the category of the road element without the need of the mask. For each road element, the category confidence level may be utilized to determine whether or not it is a high-confidence prediction result. For the high-confidence prediction result, possible subsequent manual quality inspections can be reduced, thereby further improving process efficiency on the basis of realizing the end-to-end map generation.

In the embodiment of the present disclosure, in the stage of applying the model, the to-be-processed road top view is inputted into the map-generation large model, a first visual representation is obtained by an encoder in the map-generation large model, and a second visual representation is obtained according to the first visual representation by a decoder in the map-generation large model; the vectorized point set of the road element in the to-be-processed road top view is outputted according to the second visual representation by a regression module, and the category and the category confidence level of the road element are outputted according to the second visual representation by a classification module, thereby realizing the end-to-end map generation.

FIG. 7 is a schematic structural diagram of a training apparatus for a map-generation large model provided by an embodiment of the present disclosure. As shown in FIG. 7, the training apparatus 700 for the map-generation large model includes:

an obtaining unit 701, configured to obtain a training sample set, where each training sample in the training sample set includes a road top-view sample, a first vectorized point set and a first category of a first road element in the road top-view sample, and a first mask of the road top-view sample;

a processing unit 702, configured to input the road top-view sample into an initial map-generation large model, and correspondingly output a second vectorized point set of a second road element, a second category of the second road element, and a second mask of the road top-view sample by a regression module, a classification module and a segmentation module in the initial map-generation large model respectively;

an adjusting unit 703, configured to determine a model loss according to a matching result between the second road element and the first road element, the first vectorized point set, the first category, the first mask, the second vectorized point set, the second category and the second mask, and adjust a parameter of the initial map-generation large model according to the model loss to obtain a map-generation large model.

In one implementation, the matching result includes an element-level matching result and a point-level matching result, and the training apparatus 700 of the map-generation large model further includes a matching unit, where the matching unit includes:

a first matching module, configured to determine the element-level matching result between the second road element and the first road element according to the second vectorized point set and the second category of the second road element as well as the first vectorized point set and the first category of the first road element;

a determining module, configured to determine a first road element and a second road element that are matched according to the element-level matching result;

a second matching module, configured to: for the first road element and the second road element that are matched, determine the point-level matching result between the first road element and the second road element that are matched according to the first vectorized point set of the first road element and the second vectorized point set of the second road element.

In one implementation, the adjusting unit 703 includes:

a first adjusting module, configured to determine a point-level geometric loss between matched points in the first road element and the second road element that are matched as well as an element-level geometric loss between the first road element and the second road element that are matched according to the element-level matching result, the point-level matching result, the first vectorized point set and the second vectorized point set;

a second adjusting module, configured to determine a category loss between the first road element and the second road element that are matched as well as a match validity dichotomy loss between the second road element and the first road element according to the element-level matching result, the first category and the second category;

a third adjusting module, configured to determine a segmentation loss according to the element-level matching result, the first mask and the second mask;

a fourth adjusting module, configured to perform a weighted summation of the point-level geometric loss, the element-level geometric loss, the category loss, the match validity dichotomy loss and the segmentation loss to obtain the model loss.

In one implementation, the first adjusting module includes:

a first adjusting sub-module, configured to determine a distance between the matched points in the first road element and the second road element that are matched according to the element-level matching result, the point-level matching result, the first vectorized point set and the second vectorized point set;

a second adjusting sub-module, configured to determine a sum of the distance between the matched points in the first road element and the second road element that are matched as the point-level geometric loss;

a third adjusting sub-module, configured to determine a cosine similarity between lines connecting adjacent points in the first road element and the second road element that are matched according to the element-level matching result, the point-level matching result, the first vectorized point set and the second vectorized point set;

a fourth adjusting sub-module, configured to determine a sum of the cosine similarity between the lines connecting the adjacent points in the first road element and the second road element that are matched as the element-level geometric loss.

In one implementation, the first mask includes a first semantic segmentation mask and a first instance segmentation mask, the second mask includes a second semantic segmentation mask and a second instance segmentation mask, and the fourth adjusting module includes:

a fifth adjusting sub-module, configured to determine a semantic segmentation loss between the first semantic segmentation mask and the second semantic segmentation mask;

a sixth adjusting sub-module, configured to determine an instance segmentation loss between the first instance segmentation mask and the second instance segmentation mask corresponding to the first road element and the second road element that are matched according to the element-level matching result;

a seventh adjusting sub-module, configured to determine a sum of a sum of the instance segmentation loss of the first road element and the second road element that are matched plus the semantic segmentation loss as the segmentation loss.

In one implementation, the obtaining unit 701 includes:

an obtaining module, configured to obtain a road top view and manually-labeled map data;

an extracting module, configured to extract raw data of road elements corresponding to the road top view from the manually-labeled map data, where the raw data of the road elements includes vectorized point sets and categories of the road elements;

a processing module, configured to process the road top view and the corresponding raw data of the road elements to obtain the training sample set.

The training apparatus for the map-generation large model of the embodiment of the present disclosure can be used to implement the training method for the map-generation large model of the preceding embodiments, i.e., implementation principles and technical effects thereof are similar and will not be elaborated herein.

Figure 8:
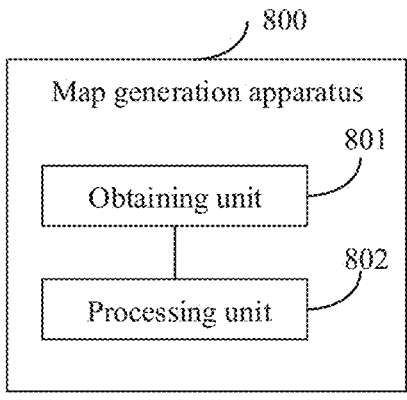
FIG. 8 is a schematic structural diagram of a map generation apparatus provided by an embodiment of the present disclosure.

FIG. 8 is a schematic structural diagram of a map generation apparatus provided by an embodiment of the present disclosure. As shown in FIG. 8, the map generation apparatus 800 includes:

an obtaining unit 801, configured to obtain a to-be-processed road top view;

a processing unit 802, configured to input the to-be-processed road top view into a map-generation large model, output a vectorized point set of a road element in the to-be-processed road top view by a regression module in the map-generation large model, and output a category of the road element and a category confidence level by a classification module in the map-generation large model;

where the map-generation large model is obtained after an iterative training for an initial map-generation large model by using a training sample set, and each training sample in the training sample set includes a road top-view sample, a first vectorized point set and a first category of a first road element in the road top-view sample, and a first mask of the road top-view sample; the regression module, the classification module and a segmentation module in the initial map-generation large model correspondingly output a second vectorized point set of a second road element, a second category of the second road element, and a second mask of the road top-view sample respectively; and a loss function of the iterative training is determined according to a matching result between the second road element and the first road element, the first vectorized point set, the first category, the first mask, the second vectorized point set, the second category and the second mask.

In one implementation, the processing unit 802 includes: a processing module, configured to: input the to-be-processed road top view into the map-generation large model; obtain a first visual representation by an encoder in the map-generation large model, and obtain a second visual representation by a decoder in the map-generation large model according to the first visual representation; output the vectorized point set of the road element in the to-be-processed road top view by the regression module according to the second visual representation; and output the category of the road element and the category confidence level by the classification module according to the second visual representation.

The map generation apparatus of the embodiment of the present disclosure can be used to implement the map generation method in the preceding embodiments, i.e., implementation principles and technical effects thereof are similar and will not be elaborated herein.

According to an embodiment of the present disclosure, the present disclosure also provides an electronic device, including: at least one processor; and a memory communicatively connected to the at least one processor; where the memory stores instructions executable by the at least one processor, and the instructions are executed by the at least one processor to enable the at least one processor to perform the method according to any one of the preceding embodiments.

According to an embodiment of the present disclosure, the present disclosure also provides a non-transient computer-readable storage medium storing computer instructions, where the computer instructions are used to cause the computer to perform the method according to any one of the preceding embodiments.

According to an embodiment of the present disclosure, the present disclosure further provides a computer program product. The computer program product includes a computer program, and the computer program is stored in a readable storage medium. At least one processor of an electronic device can read the computer program from the readable storage medium, and the at least one processor executes the computer program to cause the electronic device to perform the solution provided in any one of the preceding embodiments.

Figure 9:
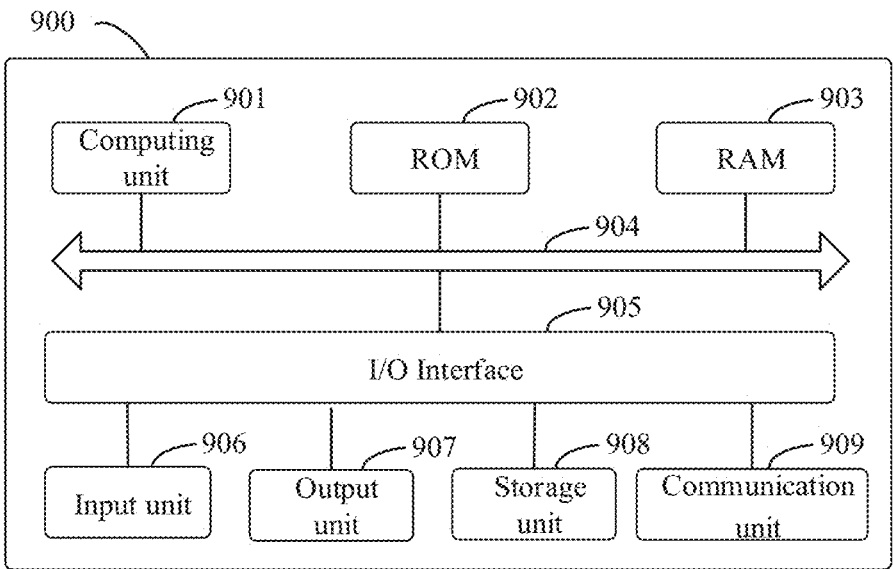
FIG. 9 is a block diagram of an electronic device used to implement a model training method and/or a map generation method of embodiments of the present disclosure.

FIG. 9 is a block diagram of an electronic device used to implement a model training method and/or a map generation method of embodiments of the present disclosure. An electronic device 900 is intended to represent various forms of digital computers, such as a laptop computer, a desktop computer, a workstation, a personal digital assistant, a server, a blade server, a mainframe computer, and other suitable computers. The electronic device can also represent various forms of mobile apparatuses, such as a personal digital assistant, a cellular phone, a smart phone, a wearable device and other similar computing apparatuses. The components shown herein as well as their connections and relationships and their functions are merely examples, and are not intended to limit the implementation of the present disclosure described and/or claimed herein.

As shown in FIG. 9, the electronic device 900 includes a computing unit 901, which can execute various appropriate actions and processing according to a computer program stored in a read-only memory (ROM) 902 or a computer program loaded from a storage unit 908 into a random access memory (RAM) 903. In the RAM 903, various programs and data required for the operation of the device 900 can also be stored. The computing unit 901, the ROM 902 and the RAM 903 are connected to each other through a bus 904. An input/output (I/O) interface 905 is also connected to the bus 904.

A plurality of components in the device 900 are connected to the I/O interface 905, including: an input unit 906, such as a keyboard, a mouse, etc.; an output unit 907, such as various types of displays, speakers, etc.; the storage unit 908, such as a disk, an optical disk, etc.; and a communication unit 909, such as a network card, a modem, a wireless communication transceiver, etc. The communication unit 909 allows the device 900 to exchange information/data with other devices through a computer network such as the Internet and/or various telecommunication networks.

The computing unit 901 may be various general-purpose and/or special-purpose processing components with processing and computing capabilities. Some examples of the computing unit 901 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processors, controllers, microcontrollers, etc. The computing unit 901 executes the various methods and processing described above, such as the model training method and/or the map generation method. For example, in some embodiments, the model training method and/or the map generation method may be implemented as a computer software program, which is tangibly contained in a machine-readable medium, such as the storage unit 908. In some embodiments, part or all of the computer program may be loaded and/or installed on the device 900 via the ROM 902 and/or the communication unit 909. When the computer program is loaded into the RAM 903 and executed by the computing unit 901, one or more steps of the model training method and/or the map generation method described above can be executed. Alternatively, in other embodiments, the computing unit 901 may be configured to execute the model training method and/or the map generation method in any other suitable manner (for example, by means of firmware).

The various embodiments of the systems and techniques described above herein may be implemented in digital electronic circuit systems, integrated circuit systems, field programmable gate arrays (FPGAs), application specific integrated circuits (ASICs), application specific standard products (ASSPs), systems on chips (SOCs), complex programmable logic devices (CPLDs), computer hardware, firmware, software, and/or combinations thereof. These various implementations may include: being implemented in one or more computer programs that can be executed and/or interpreted on a programmable system including at least one programmable processor. The programmable processor may be a special-purpose or general-purpose programmable processor, and can receive data and instructions from a storage system, at least one input apparatus and at least one output apparatus, and transmit data and instructions to the storage system, the at least one input apparatus and the at least one output apparatus.

The program codes used to implement the method of the present disclosure can be written in any combination of one or more programming languages. These program codes can be provided to processors or controllers of general-purpose computers, special-purpose computers, or other programmable data processing apparatuses, so that when the program codes are executed by the processors or controllers, the functions/the operations specified in the flowcharts and/or the block diagrams are implemented. The program codes can be executed entirely on a machine, partly on a machine, as an independent software package, partly executed on a machine and partly executed on a remote machine, or entirely executed on a remote machine or a server.

In the context of the present disclosure, a machine-readable medium may be a tangible medium, which may contain or store a program for the instruction execution system, apparatus or device to use or to be used in combination with the instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination of the foregoing. More specific examples of the machine-readable storage medium would include electrical connections based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above content.

To provide interaction with users, the systems and techniques described herein can be implemented on a computer which has: a display apparatus (e.g., a CRT (cathode ray tube) or LCD (liquid crystal display) monitor) for displaying information to users; as well as a keyboard and a pointing apparatus (e.g., a mouse or a trackball) through which users can provide inputs to the computer. Other kinds of apparatuses can also be used to provide interaction with users. For example, a feedback provided to a user can be any form of sensory feedback (e.g., visual feedback, auditory feedback, or tactile feedback); and an input from the user can be received in any form (including acoustic input, voice input or tactile input).

The systems and techniques described herein can be implemented in a computing system including background components (e.g., as a data server), or a computing system including middleware components (e.g., an application server), or a computing system including front-end components (e.g., a user computer with a graphical user interface or a web browser through which users can interact with implementations of the systems and techniques described herein), or a computing system including any combination of such background components, middleware components or front-end components. Components of the system can be connected to each other through digital data communication in any form or medium (e.g., a communication network). Examples of the communication network include: a local area network (LAN), a wide area network (WAN) and the Internet.

A computer system may include a client and a server. The client and server are generally remote from each other and usually interact through a communication network. A relationship between the client and the server is generated by computer programs running on corresponding computers and having a client-server relationship with each other. The server can be a cloud server, which is also known as a cloud computing server or a cloud host. It is a host product in a cloud computing service system to solve the defects of huge management difficulty and weak business scalability existing in traditional physical host and VPS service ("Virtual Private Server", or "VPS" for short). The server can also be a server of a distributed system, or a server combined with a blockchain.

It should be understood that steps can be reordered, added or deleted using the various forms of processes shown above. For example, the steps described in the present disclosure can be executed in parallel, sequentially or in a different order, so long as the desired result of the technical solution disclosed in the present disclosure can be achieved, which is not limited herein.

The above specific implementations do not constitute a limitation to the protection scope of the present disclosure. It should be understood by those skilled in the art that various modifications, combinations, sub-combinations and substitutions may be performed according to design requirements and other factors. Any modification, equivalent substitution, improvement and others that are made within the spirit and principle of the present disclosure shall be included in the protection scope of the present disclosure.

What is claimed is:

1. A training method for a map-generation large model, comprising:

obtaining a training sample set, wherein each training sample in the training sample set comprises a road top-view sample, a first vectorized point set and a first category of a first road element in the road top-view sample, and a first mask of the road top-view sample; the road top-view sample is a road top view generated based on a panoramic image and point cloud data of the panoramic image;

inputting the road top-view sample into an initial map-generation large model, and correspondingly outputting a second vectorized point set of a second road element, a second category of the second road element, and a second mask of the road top-view sample by a regression module, a classification module and a segmentation module in the initial map-generation large model respectively;

determining a model loss according to a matching result between the second road element and the first road element, the first vectorized point set, the first category, the first mask, the second vectorized point set, the second category and the second mask, and adjusting a parameter of the initial map-generation large model according to the model loss to obtain a map-generation large model, wherein the map-generation large model is used to construct a high-precision map for autonomous driving.

2. The method according to claim 1, wherein the matching result comprises an element-level matching result and a point-level matching result, and a determination method for the matching result comprises:

determining the element-level matching result between the second road element and the first road element according to the second vectorized point set and the second category of the second road element as well as the first vectorized point set and the first category of the first road element;

determining a first road element and a second road element that are matched according to the element-level matching result;

for the first road element and the second road element that are matched, determining the point-level matching result between the first road element and the second road element that are matched according to the first vectorized point set of the first road element and the second vectorized point set of the second road element.

3. The method according to claim 2, wherein the determining the model loss according to the matching result between the second road element and the first road element, the first vectorized point set, the first category, the first mask, the second vectorized point set, the second category and the second mask comprises:

determining a point-level geometric loss between matched points in the first road element and the second road element that are matched as well as an element-level geometric loss between the first road element and the second road element that are matched according to the element-level matching result, the point-level matching result, the first vectorized point set and the second vectorized point set;

determining a category loss between the first road element and the second road element that are matched as well as a match validity dichotomy loss between the second road element and the first road element according to the element-level matching result, the first category and the second category;

determining a segmentation loss according to the element-level matching result, the first mask and the second mask;

performing a weighted summation of the point-level geometric loss, the element-level geometric loss, the category loss, the match validity dichotomy loss and the segmentation loss to obtain the model loss.

4. The method according to claim 3, wherein the determining the point-level geometric loss between the matched points in the first road element and the second road element that are matched as well as the element-level geometric loss between the first road element and the second road element that are matched according to the element-level matching result, the point-level matching result, the first vectorized point set and the second vectorized point set comprises:

determining a distance between the matched points in the first road element and the second road element that are matched according to the element-level matching result, the point-level matching result, the first vectorized point set and the second vectorized point set;

determining a sum of the distance between the matched points in the first road element and the second road element that are matched as the point-level geometric loss;

determining a cosine similarity between lines connecting adjacent points in the first road element and the second road element that are matched according to the element-level matching result, the point-level matching result, the first vectorized point set and the second vectorized point set;

determining a sum of the cosine similarity between the lines connecting the adjacent points in the first road element and the second road element that are matched as the element-level geometric loss.

5. The method according to claim 3, wherein the first mask comprises a first semantic segmentation mask and a first instance segmentation mask, the second mask comprises a second semantic segmentation mask and a second instance segmentation mask, and the determining the segmentation loss according to the element-level matching result, the first mask and the second mask comprises:

determining a semantic segmentation loss between the first semantic segmentation mask and the second semantic segmentation mask;

determining an instance segmentation loss between the first instance segmentation mask and the second instance segmentation mask corresponding to the first road element and the second road element that are matched according to the element-level matching result;

determining a sum of the instance segmentation loss of the first road element and the second road element that are matched plus the semantic segmentation loss as the segmentation loss.

6. The method according to claim 1, wherein the obtaining the training sample set comprises:

obtaining a road top view and manually-labeled map data;

extracting raw data of road elements corresponding to the road top view from the manually-labeled map data, wherein the raw data of the road elements comprises vectorized point sets and categories of the road elements;

processing the road top view and the corresponding raw data of the road elements to obtain the training sample set.

7. A map generation method, comprising:

obtaining a to-be-processed road top view;

inputting the to-be-processed road top view into a map-generation large model, outputting a vectorized point set of a road element in the to-be-processed road top view by a regression module in the map-generation large model, and outputting a category of the road element and a category confidence level by a classification module in the map-generation large model;

constructing a high-precision map for autonomous driving according to the vectorized point set of the road element and the category of the road element;

wherein the map-generation large model is obtained after an iterative training for an initial map-generation large model by using a training sample set, and each training sample in the training sample set comprises a road top-view sample, a first vectorized point set and a first category of a first road element in the road top-view sample, and a first mask of the road top-view sample; the regression module, the classification module and a segmentation module in the initial map-generation large model correspondingly output a second vectorized point set of a second road element, a second category of the second road element, and a second mask of the road top-view sample respectively; and a loss function of the iterative training is determined according to a matching result between the second road element and the first road element, the first vectorized point set, the first category, the first mask, the second vectorized point set, the second category and the second mask; the road top-view sample is a road top view generated based on a panoramic image and point cloud data of the panoramic image.

8. The method according to claim 7, wherein the inputting the to-be-processed road top view into the map-generation large model, outputting the vectorized point set of the road element in the to-be-processed road top view by the regression module in the map-generation large model, and outputting the category of the road element and the category confidence level by the classification module in the map-generation large model comprises:

inputting the to-be-processed road top view into the map-generation large model; obtaining a first visual representation by an encoder in the map-generation large model, and obtaining a second visual representation by a decoder in the map-generation large model according to the first visual representation; outputting the vectorized point set of the road element in the to-be-processed road top view by the regression module according to the second visual representation; and outputting the category of the road element and the category confidence level by the classification module according to the second visual representation.

9. A training apparatus for a map-generation large model, comprising:

at least one processor; and a memory communicatively connected to the at least one processor; wherein, the memory stores instructions executable by the at least one processor, and the instructions are executed by the at least one processor to enable the at least one processor to:

obtain a training sample set, wherein each training sample in the training sample set comprises a road top-view sample, a first vectorized point set and a first category of a first road element in the road top-view sample, and a first mask of the road top-view sample; the road top-view sample is a road top view generated based on a panoramic image and point cloud data of the panoramic image;

input the road top-view sample into an initial map-generation large model, and correspondingly output a second vectorized point set of a second road element, a second category of the second road element, and a second mask of the road top-view sample by a regression module, a classification module and a segmentation module in the initial map-generation large model respectively;

determine a model loss according to a matching result between the second road element and the first road element, the first vectorized point set, the first category, the first mask, the second vectorized point set, the second category and the second mask, and adjust a parameter of the initial map-generation large model according to the model loss to obtain a map-generation large model, wherein the map-generation large model is used to construct a high-precision map for autonomous driving.

10. The apparatus according to claim 9, wherein the matching result comprises an element-level matching result and a point-level matching result, and the at least one processor is further enabled to:

determine the element-level matching result between the second road element and the first road element according to the second vectorized point set and the second category of the second road element as well as the first vectorized point set and the first category of the first road element;

determine a first road element and a second road element that are matched according to the element-level matching result;

for the first road element and the second road element that are matched, determine the point-level matching result between the first road element and the second road element that are matched according to the first vectorized point set of the first road element and the second vectorized point set of the second road element.

11. The apparatus according to claim 10, wherein the at least one processor is further enabled to:

determine a point-level geometric loss between matched points in the first road element and the second road element that are matched as well as an element-level geometric loss between the first road element and the second road element that are matched according to the element-level matching result, the point-level matching result, the first vectorized point set and the second vectorized point set;

determine a category loss between the first road element and the second road element that are matched as well as a match validity dichotomy loss between the second road element and the first road element according to the element-level matching result, the first category and the second category;

determine a segmentation loss according to the element-level matching result, the first mask and the second mask;

perform a weighted summation of the point-level geometric loss, the element-level geometric loss, the category loss, the match validity dichotomy loss and the segmentation loss to obtain the model loss.

12. The apparatus according to claim 11, wherein the at least one processor is further enabled to:

determine a distance between the matched points in the first road element and the second road element that are matched according to the element-level matching result, the point-level matching result, the first vectorized point set and the second vectorized point set;

determine a sum of the distance between the matched points in the first road element and the second road element that are matched as the point-level geometric loss;

determine a cosine similarity between lines connecting adjacent points in the first road element and the second road element that are matched according to the element-level matching result, the point-level matching result, the first vectorized point set and the second vectorized point set;

determine a sum of the cosine similarity between the lines connecting the adjacent points in the first road element and the second road element that are matched as the element-level geometric loss.

13. The apparatus according to claim 11, wherein the first mask comprises a first semantic segmentation mask and a first instance segmentation mask, the second mask comprises a second semantic segmentation mask and a second instance segmentation mask, and the at least one processor is further enabled to:

determine a semantic segmentation loss between the first semantic segmentation mask and the second semantic segmentation mask;

determine an instance segmentation loss between the first instance segmentation mask and the second instance segmentation mask corresponding to the first road element and the second road element that are matched according to the element-level matching result;

determine a sum of the instance segmentation loss of the first road element and the second road element that are matched plus the semantic segmentation loss as the segmentation loss.

14. The apparatus according to claim 9, wherein the at least one processor is further enabled to:

obtain a road top view and manually-labeled map data;

extract raw data of road elements corresponding to the road top view from the manually-labeled map data, wherein the raw data of the road elements comprises vectorized point sets and categories of the road elements;

process the road top view and the corresponding raw data of the road elements to obtain the training sample set.

15. A map generation apparatus, comprising:

at least one processor; and a memory communicatively connected to the at least one processor; wherein, the memory stores instructions executable by the at least one processor, and the instructions are executed by the at least one processor to enable the at least one processor to perform the method according to claim 7.

16. The apparatus according to claim 15, wherein the at least one processor is further enabled to:

input the to-be-processed road top view into the map-generation large model; obtain a first visual representation by an encoder in the map-generation large model, and obtain a second visual representation by a decoder in the map-generation large model according to the first visual representation; output the vectorized point set of the road element in the to-be-processed road top view by the regression module according to the second visual representation; and output the category of the road element and the category confidence level by the classification module according to the second visual representation.

17. A non-transient computer-readable storage medium, storing computer instructions, wherein the computer instructions are used to cause a computer to perform the method according to claim 1.

18. The method according to claim 1, wherein the first category is used to indicate a style or a color of the first road element, and the second category is used to indicate a style or a color of the second road element.

19. The method according to claim 1, wherein the first vectorized point set is used to indicate a shape and a position of the first road element, and the second vectorized point set is used to indicate a shape and a position of the second road element.

* * * * *